United States Patent Office 2,842,531
Patented July 8, 1958

2,842,531

PHENYLALKENE HYDROCARBON POLYMERS

Warren Nesmith Baxter, Wilmington, Del., assignor to E. I. du Pont de Nemours and Company, Wilmington, Del., a corporation of Delaware No Drawing. Application June 28, 1955
Serial No. 518,689

14 Claims. (Cl. 260—93.5)

This invention relates to novel hydrocarbon polymers, in particular, to novel solid polymers of phenylalkenes. This application is a continuation-in-part of my copending application S. N. 492,795, filed March 7, 1955, now abandoned.

Solid polymers of styrene, which is the first member of the phenylalkene series, are well known. Polystyrene is generally prepared by free radical initiated polymerization processes. Such methods, however, have failed to polymerize the higher phenylalkenes, such as phenylpropene and phenylbutene to solid high molecular weight polymers.

It is the object of the present invention to prepare novel and highly useful solid polymers from phenylalkenes, in which the phenyl group is separated from the ethylenically unsaturated double-bond end group by at least one carbon atom. It is furthermore the object of the present invention to prepare solid phenylalkene polymers which are high melting, crystalline hydrocarbon polymers. Another object of the present invention is to prepare polymers useful in the manufacture of fibers and films. Other objects will become apparent hereinafter.

The objects of the present invention are accomplished by polymerizing phenylalkenes, having at least one carbon atom between the phenyl group and the ethylenically unsaturated double-bond end group, —CH=CH$_2$, to solid, crystalline polymers. In contrast to commercially available polystyrene, the preferred polymers of the present invention have melting points which are significantly higher than polystyrene and are also crystalline polymers. The polymers of the present invention can be obtained by polymerizing the phenylalkenes with a coordination initiator. Coordination initiators are formed when a compound of a transition element of groups III$b$, IV$b$, V$b$ and VI$b$ of the periodic table of elements is admixed with a strong reducing agent, preferably in the presence of an inert, organic, liquid hydrocarbon and in the absence of moisture and oxygen. Preferred compounds of the first component of this highly reactive initiator system are the halides and esters of titanium, vanadium and zirconium. Preferred compounds of the second component are those having at least one metal to hydrocarbon bond such as lithium aluminum alkyls, aluminum alkyls, and alkyl aluminum halides. Other useful reducing agents are metal hydrides, and alkali metals in finely suspended form. This initiator system has been called a coordination initiator because it is believed that the unsaturated hydrocarbon will coordinate with the reduced transition element as it is polymerized.

The phenylalkenes useful in the present invention are those having the general formula

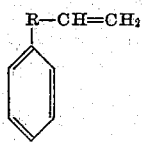

R—CH=CH$_2$ where R is a divalent hydrocarbon radical such as a methylene radical, a substituted methylene radical, an ethylene radical, a propylene radical, a substituted ethylene radical, etc. The preferred monomers are those where the hydrocarbon radical is a methylene group, an ethyl group and a methyl substituted methylene group. The polymers obtained from these monomers are preferred because of their high melting points, their crystallinity and their better mechanical properties such as stiffness and toughness.

The polymers obtained by the present invention decrease in crystallinity, melting point, and stiffness as the number of carbon atoms between the ethylenically unsaturated end group and the phenyl group is increased. Thus the crystalline melting points of polyphenylpropene, polyphenylbutene and polyphenylpentene decrease in that order as does their crystallinity. The substitution of a hydrogen by a methyl group in the divalent hydrocarbon radical will increase the melting point of the polymer. Thus poly(3-phenylbutene-1) has a higher melting point than poly(3-phenylpropene-1). Polymers prepared from phenylalkenes having more than two carbon atoms between the phenyl group and the ethylenically unsaturated end group, such as poly(5-phenylpentene-1) are generally of low crystallinity and low melting point. Polymers of 5-phenylpentene-1 and monomers having a still greater number of carbon atoms show elastomeric properties. For these reasons these polymers are not preferably used as a plastic from which films, fibers and articles can be extruded or molded.

The phenylalkenes useful in obtaining the polymers of the present invention may be prepared by several techniques. One method is by the reaction of unsaturated alkylhalides with aromatic halides and zinc or sodium. Thus by reacting benzylchloride with allylchloride and zinc or sodium, 4-phenylbutene-1 is obtained. In another method as used in one of the examples hereinbelow, the phenylalkene is obtained by reacting an aromatic magnesium halide with an unsaturated alkylhalide. Thus the reaction of phenylmagnesium chloride with allylchloride will give rise to 3-phenylpropene-1.

The polymerization of the phenylalkenes of the present invention using the hereinabove-mentioned initiators can be carried out over a wide range of temperatures and pressures. The polymerization is most conveniently carried out at room temperatures and atmospheric pressure. If desired, higher temperatures and higher pressures may be employed.

The polymerization is preferably carried out in the presence of a liquid reaction medium. Suitable inert reaction media are saturated hydrocarbons such as alkanes and cycloalkanes liquid at reaction temperatures and aromatic hydrocarbons such as benzene, toluene and xylene. Since oxygen and hydroxyl groups affect the activity of the initiator, the presence of such compounds should be avoided.

The invention is further illustrated by the following examples.

Example I

To a 170 ml. solution of 2 molar benzylmagnesium bromide in anhydrous ether was added dropwise 63 grams of allyl bromide at a rate slow enough to keep the reaction mixture refluxing gently. After complete addition, the mixture was agitated for 30 minutes. The mixture was then treated with 300 ml. of 10% aqueous hydrochloric acid. The organic layer was separated and distilled. A 30 gram fraction boiling at 72 to 75° C. at 20 mm. pressure analyzed to be 4-phenylbutene-1.

To a solution of 0.01 mole of titanium tetrachloride in 100 ml. of cyclohexane was added 20 ml. of lithium aluminum cyclohexenylethyl and 10 grams of 4-phenylbutene-1 under a blanket of nitrogen. The reaction mixture was agitated gently for one hour and then poured into methanol resulting in the precipitation of the polymer formed. The poly(4-phenylbutene-1) was filtered, washed and dried resulting in a white solid material weighing 5 grams. The poly(4-phenylbutene-1) could be molded into tough, flexible films by heating to 180° C. under 30,000 p. s. i. pressure for 2 minutes. The polymer was found to have a density of 0.98 and an inherent viscosity of 0.62 in decahydronaphthalene at a temperature of 125° C.

*Example II*

The polymerization initiator was prepared in the following way. A solution of lithium aluminum tetradecyl was prepared by heating at about 180° C. under nitrogen an agitated mixture of 1400 ml. of decahydronaphthalene, 300 ml. of decene-1 and 15.6 grams of lithium aluminum hydride. Into a glass reaction vessel equipped with stirrer, reflux condenser gas inlet and outlet means was charged under a blanket of nitrogen 100 ml. of the above-prepared lithium aluminum tetradecyl solution, 100 ml. of cyclohexane, and 15 ml. of 1.08 molar titanium tetrachloride in cyclohexane.

The polymerization of 4-phenylbutene-1 was carried out by adding 45 grams of the monomer to the reaction mixture and agitating the mixture for a period of 24 hours. The reaction mixture was poured into excess methanol and the coagulated polymer was filtered, washed and dried. The dry weight of the poly(4-phenylbutene-1) having an inherent viscosity of 3.65 as measured in decahydronaphthalene at 130° C. was 24 grams. The polymer was pressed at 200° C. and 10,000 p. s. i. to a tough film. Strips of film could be drawn over a hot pin at 125° C. to give highly crystalline, oriented structures. The poly(4-phenylbutene-1) exhibited a crystalline melting point of 160° C. The polymer could also be extruded from a 0.03 inch spinneret at 225° C. to give crystalline, orientable fibers.

*Example III*

Into a glass reaction vessel equipped with stirrer, reflux condenser gas inlet and outlet means was charged under a blanket of nitrogen 100 ml. of the lithium aluminum tetradecyl solution prepared as described in Example II, 16 ml. of a 1.08 molar titanium tetrachloride solution in cyclohexane, and 100 ml. of cyclohexane. To this reaction mixture was added 50 ml. of 3-phenylpropene-1. The polymerization was allowed to continue for 72 hours at room temperature under mild agitation. The reaction mixture was poured into excess methanol and the polymer filtered, washed and dried. The yield of poly(3-phenylpropene-1) was 16 grams. The polymer could be molded into tough films at 200° C. under 10,000 p. s. i. pressure. The poly(3-phenylpropene-1) could be melt-spun into crystalline orientable fibers at 250° C. The polymer exhibited a crystalline melting point of abount 230° C. as determined on a hot stage between crossed polaroid lenses.

*Example IV*

Employing the apparatus and initiator illustrated in Examples II and III, 23 grams of 3-phenylbutene-1 was added to the initiator mixture. The polymerization was allowed to proceed for 24 hours at room temperature under slight agitation. The resulting reaction mixture was poured into excess methanol and the insoluble poly-(3-phenylbutene-1) was filtered, washed and dried. The yield of poly(3-phenylbutene-1) was 2.3 grams. The polymer could be pressed into clear films at 250° C. The film so produced showed a high crystallinity as measured by X-ray diffraction. The crystalline melting point of poly(3-phenylbutene-1) was found to be above 360° C. as determined on a hot stage between crossed polaroid lenses.

*Example V*

Employing the apparatus and initiator illustrated in Examples II and III, 35 ml. of 5-phenylpentene-1 was added to the initiator mixture. The polymerization was allowed to proceed for 24 hours at room temperature under slight agitation. The resulting reaction mixture was poured into excess methanol and the insoluble poly(5-phenylpentene-1) was filtered, washed and dried. The polymer was found to have an inherent viscosity of 1.87 as measured in decahydronaphthalene at 130° C. The poly-(5-phenylpentene-1) isolated was a soft rubbery material of low crystallinity. It could be melt-spun to elastomeric filaments which fused together on handling. No crystalline melting point could be detected. The polymer was found to have a polymer softening point in the range of 90–100° C. The softening point temperature, being that temperature at which the polymer leaves a trail when drawn across a hot surface.

The examples hereinabove are given for purposes of illustration and are not intended to limit the scope of the present invention.

Interpolymers of the phenylalkenes with other ethylenically unsaturated monomers, such as ethylene, propylene and isobutylene, are readily prepared by bubbling the gaseous monomers through the polymerizing reaction mixture. The degree of interpolymerization can be easily controlled by the rate of addition of these gaseous co-monomers, which, in general, are more reactive than the phenylalkenes. It is, of course, also possible to interpolymerize two phenylalkenes of different structure.

The solid polymers of the present invention have numerous important applications. They can, in general, be converted into shaped articles, and extruded into fibers and films by methods used for other thermoplastic polymers. They may be blended with other polymers. Fillers or foaming agents may be added.

I claim:

1. Solid polymers of phenylalkenes, said polymers having recurring units of

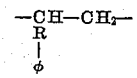

wherein R is a divalent aliphatic radical having at least one carbon atom and having melting points in the range of 90° C. to above 360° C.

2. A solid polymer of 3-phenylpropene-1 having recurring units of

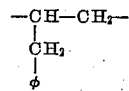

having a crystalline melting point in the range of 220 to 240° C.

3. A solid homopolymer of 3-phenylpropene-1 having a crystalline melting point in the range of 220 to 240° C.

4. Poly(3-phenylpropene-1) as set forth in claim 3 in funicular form.

5. Poly(3-phenylpropene-1) as set forth in claim 3 in film form.

6. A solid polymer of 4-phenylbutene-1 having recurring units of

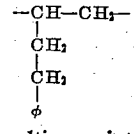

having a crystalline melting point of 140 to 160° C.

7. A solid homopolymer of 4-phenylbutene-1 having a crystalline melting point in the range of 140 to 160° C.

8. Poly(4-phenylbutene-1) as set forth in claim 7 in funicular form.

9. Poly(4-phenylbutene-1) as set forth in claim 7 in film form.

10. A solid polymer of 3-phenylbutene-1 having recurring units of

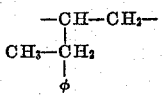

having a crystalline melting point above 360° C.

11. A solid homopolymer of 3-phenylbutene-1 having a crystalline melting point above 360° C.

12. Poly(3-phenylbutene-1) as set forth in claim 11 in funicular form.

13. Poly(3-phenylbutene-1) as set forth in claim 11 in film form.

14. A solid homopolymer of 5-phenylpentene-1 having a polymer softening point in the range of 90 to 100° C.

References Cited in the file of this patent
UNITED STATES PATENTS 2,721,189   Anderson et al. _____ Oct. 18, 1955

OTHER REFERENCES

Schmidt: Brennstoff Chem., 23 (1942), 235–40 and 247–52, abstracted in C. A., 37, 4236 (1943).